(12) United States Patent
Jin et al.

(10) Patent No.: US 11,362,328 B2
(45) Date of Patent: Jun. 14, 2022

(54) COMPOSITE-COATED NANO-TIN NEGATIVE ELECTRODE MATERIAL AND PREPARATION METHOD AND USE THEREOF

(71) Applicant: INSTITUTE OF PHYSICS, CHINESE ACADEMY OF SCIENCES, Beijing (CN)

(72) Inventors: Zhou Jin, Beijing (CN); Hailong Yu, Beijing (CN); Xuejie Huang, Beijing (CN)

(73) Assignee: INSTITUTE OF PHYSICS, CHINESE ACADEMY OF SCIENCES, Beijing (CN)

( * ) Notice: Subject to any disclaimer, the term of this patent is extended or adjusted under 35 U.S.C. 154(b) by 113 days.

(21) Appl. No.: 16/631,752

(22) PCT Filed: Sep. 29, 2018

(86) PCT No.: PCT/CN2018/108693
§ 371 (c)(1),
(2) Date: Jan. 16, 2020

(87) PCT Pub. No.: WO2019/114373
PCT Pub. Date: Jun. 20, 2019

(65) Prior Publication Data
US 2020/0185711 A1    Jun. 11, 2020

(30) Foreign Application Priority Data

Dec. 12, 2017  (CN) .......................... 201711317663.6

(51) Int. Cl.
*H01M 4/38*     (2006.01)
*H01M 4/04*     (2006.01)
(Continued)

(52) U.S. Cl.
CPC ......... *H01M 4/387* (2013.01); *H01M 4/0428* (2013.01); *H01M 4/0452* (2013.01);
(Continued)

(58) Field of Classification Search
None
See application file for complete search history.

(56) References Cited

U.S. PATENT DOCUMENTS

2017/0288211 A1    10/2017  Zhamu et al.

FOREIGN PATENT DOCUMENTS

| CN | 1705148 A | 12/2005 |
| CN | 1885594 A | 3/2008 |

(Continued)

OTHER PUBLICATIONS

Machine translation of CN 102352496 (Year: 2012).*
(Continued)

*Primary Examiner* — Wyatt P McConnell
(74) *Attorney, Agent, or Firm* — Christensen O'Connor Johnson Kindness PLLC

(57) ABSTRACT

The invention provides a composite-coated nano-tin negative electrode material, which comprises a tin-based nanomaterial, a nano-copper layer coated on the surface of the tin-based nanomaterial and a conductive protective layer coated on the surface of the nano-copper layer. The nano-copper layer can inhibit the volume expansion of nano-tin, keep the nano-tin material from cracking, avoid direct contact between nano-tin and electrolyte to form stable SEI and increase the conductivity of the electrode. Coating a conductive layer on the surface of the nano-copper layer can effectively inhibit the oxidation of nano-copper, thus improving its electrochemical performance. The composite-coated nano-tin negative electrode material according to the invention is used as a negative electrode material of a
(Continued)

lithium-ion battery, has excellent electrochemical performance, and has potential application prospects in portable mobile devices and electric vehicles.

18 Claims, 6 Drawing Sheets

(51) Int. Cl.
    *H01M 4/36*     (2006.01)
    *H01M 10/0525*     (2010.01)
    *H01M 4/02*     (2006.01)

(52) U.S. Cl.
    CPC ....... *H01M 4/366* (2013.01); *H01M 10/0525* (2013.01); *H01M 2004/027* (2013.01)

(56) References Cited

FOREIGN PATENT DOCUMENTS

| | | |
|---|---|---|
| CN | 102352496 A | 2/2012 |
| CN | 102779988 A | 11/2012 |
| CN | 104009213 A | 8/2014 |
| CN | 104979559 A | 10/2015 |
| CN | 105047247 A | 11/2015 |
| CN | 106058171 A | 10/2016 |
| CN | 106410159 A | 2/2017 |
| CN | 107039640 A | 8/2017 |
| CN | 107492651 A | 12/2017 |
| CN | 108206285 A | 6/2018 |
| JP | 2013131465 A | 7/2013 |

OTHER PUBLICATIONS

Machine translation of CN 104009213 (Year: 2014).*
International Search Report dated Jan. 4, 2019, issued in related International Application No. PCT/CN2018/108693, filed Sep. 29, 2018, 5 pages.
First Office Action and Search Report dated Jan. 3, 2020, issued in Chinese Application No. 201711317663.6, filed Dec. 12, 2017, 21 pages.
Extended European Search Report dated Feb. 2, 2021, issued in EP Application No. 18887832.6, filed Sep. 29, 2018, 8 pages.

* cited by examiner

COMPOSITE-COATED NANO-TIN NEGATIVE ELECTRODE MATERIAL AND PREPARATION METHOD AND USE THEREOF

CROSS-REFERENCES TO RELATED APPLICATIONS

This application is a National Stage of International Application No. PCT/CN2018/108693, filed Sep. 29, 2018, which claims priority to Chinese Application No. 201711317663.6, filed Dec. 12, 2017, the disclosures of which are incorporated herein by reference in their entirety.

TECHNICAL FIELD

This invention relates to the field of negative electrode materials for lithium-ion batteries, and specifically relates to a composite-coated nano-tin negative electrode material, and its preparation methods and use.

BACKGROUND ART

Lithium-ion batteries are widely concerned in the world because of their advantages of high voltage, high energy density, good safety, light weight, low self-discharge, long cycle life, no memory effect, no pollution and the like. Lithium-ion battery electrode materials have also become a research hotspot in the battery industry worldwide. Graphite is a commercially available negative electrode material of a lithium ion battery, which has good cycle performance. However, the capacity of graphite is relatively low, and the potential of the electrode after lithium storage is similar to that of lithium metal. When the battery is overcharged, lithium metal is prone to precipitate on the surface of the carbon electrode, forming dendrites and causing short circuits and the like.

Tin-based materials are considered to be one of the candidates for replacing carbon negative electrode materials because of their high capacity, good processing properties, good electrical conductivity, no solvent co-intercalation problems, rapid charge and discharge capabilities and the like. However, the reversible formation and decomposition of Li—Sn alloys are accompanied by huge volume changes, which easily lead to pulverization of tin particles, causing the active material to fall off the current collector and resulting in poor cycle life of tin-based materials. At the same time, when tin particles are exposed to the electrolyte, an unstable SEI film is formed on the tin surface, which reduces the cycle performance of the electrode material. Therefore, if the problems of pulverization, poor conductivity and the formation of unstable SEI of tin negative electrode during lithium intercalation/deintercalation process can be solved, it would contribute to the applications of tin negative electrode in the fields of electronic products and new energy vehicles, which would improve human lives and the environment. This is the biggest problem with tin-based materials that needs to be overcome.

In order to solve the problems of pulverization and the unstable SEI of tin negative electrode during lithium intercalation/deintercalation process, a surface coating method is generally used to improve the cycle performance of the tin negative electrode material. On the one hand, using nano-tin can reduce the absolute volume change of tin particles caused by lithium ion intercalation, and reduce the internal stress of the composite materials; on the other hand, coating a material with good conductivity on the surface of nano-tin increases its conductivity while avoiding direct contact between tin and the electrolyte, thus a stable SEI film forms.

DESCRIPTION OF THE INVENTION

Accordingly, the object of the present invention is to make up for the deficiencies of the prior art, and to provide a lithium-ion negative electrode material capable of improving the electrochemical cycling characteristics of a tin negative electrode material, and a method for preparing the same and use thereof.

The invention provides a composite-coated nano-tin negative electrode material comprising: a tin-based nanomaterial, a nano-copper layer coated on the surface of the tin-based nanomaterial and a conductive protective layer coated on the surface of the nano-copper layer.

In the nano-tin negative electrode material according to the invention, the nano-copper layer can relieve the volume expansion of the tin-based nanomaterial and has good plasticity.

In the nano-tin negative electrode material according to the invention, the tin-based nanomaterial may be one or more of tin nanomaterial, tin-carbon nanomaterial and tin alloy nanomaterial. The nanomaterial may be in the form of nanoparticles, nanowires, nanosheets and the like. In the tin-carbon nanomaterial and the tin alloy nanomaterial, the weight percentage content of tin may be 10%-90%. The tin alloy may be selected from one or more of tin antimony alloy, tin silicon alloy, tin silver alloy, tin copper alloy and the like.

In the tin-based nanomaterial, the particle size of the nanoparticle may be 5-1000 nm, preferably 20-300 nm; the length of the nanowire may be 10-5000 nm, the diameter may be 5-1000 nm, the preferred length is 100-2000 nm and the preferred diameter is 20-300 nm. Both the length and the width of the nanosheets may be 10-5000 nm, the thickness may be 1-500 nm, and preferably, the length and the width of the nanosheets are 100-2000 nm and the thickness is 1-100 nm. The nano-copper layer may be nano-copper particle or a copper coating layer with nanometer thickness. The particle size of the copper particle may be 0.5-100 nm, preferably 1-20 nm; and the thickness of the copper coating layer may be 0.5-100 nm, preferably 1-50 nm.

In order to prevent tin and copper from forming an alloy, in a preferred embodiment of the present invention, a carbon layer may be further provided between the tin-based nanoparticle and the nano-copper layer, and the thickness of the carbon layer may be 1-50 nm, preferably 5-20 nm.

In the nano-tin negative electrode material according to the invention, the thickness of the conductive protective layer may be 1-100 nm, preferably 2-20 nm.

In the nano-tin negative electrode material according to the invention, the mass of the copper layer accounts for 2-70 wt %, preferably 10-30 wt %, of the nano-tin negative electrode material; and the mass of the conductive protective layer accounts for 0.1-20 wt %, preferably 1-10 wt %, of the nano-tin negative electrode material.

The present invention also provides a method for preparing the aforesaid composite-coated nano-tin negative electrode material, which comprises the steps of:

(1) adding a tin-based nanomaterial into a solvent to obtain a suspension, and then ultrasonically dispersing the suspension;

(2) adding a copper plating agent to the ultrasonically dispersed suspension, and then adding a reducing agent to perform chemical copper plating, finally filtrating, washing and drying the same in vacuum oven to obtain a nano-copper-coated tin-based nanocomposite material; and (3) coating a conductive protective layer on the surface of the nano-copper-coated tin-based nanocomposite material.

In the preparation method according to the invention, the method can further comprise: (4) heat treating the composite material obtained in step (3) to cure it.

In the preparation method according to the invention, the method may further comprise: coating a carbon layer on the surface of the nano-tin-based material before step (1). Coating a carbon layer on the surface of the nano-tin-based material may be carried out by a method including hydrothermal carbon coating or CVD carbon coating, preferably CVD carbon coating.

In the preparation method according to the invention, the solvent in step (1) may be one or more of water, methanol, ethanol, propanol, isopropanol, butanol and ethylene glycol, preferably two or more of water, methanol, ethanol, propanol, isopropanol, butanol and ethylene glycol; more preferably a mixture of water and ethanol or a mixture of water and methanol, wherein ethanol or methanol may function as a dispersant. In the nano-tin suspension, the concentration of nano-tin may be 0.1-10 $g \cdot L^{-1}$, preferably 0.5-5 $g \cdot L^{-1}$.

In the method according to the present invention, the composition of the copper plating agent in step (2) may be as follows: soluble copper salt: 1-20 $g \cdot L^{-1}$, preferably 1-10 $g \cdot L^{-1}$; potassium sodium tartrate ($C_4O_6H_4KNa$): 5-100 $g \cdot L^{-1}$, preferably 10-30 $g \cdot L^{-1}$; ethylenediaminetetraacetic acid ($C_{10}H_{16}N_2O_8$) or ammonia water ($NH_4 \cdot H_2O$): 5-100 $g \cdot L^{-1}$, preferably 10-30 $g \cdot L^{-1}$; and 2,2-bipyridine ($C_{10}H_8N_2$) 1-50 $mg \cdot L^{-1}$, preferably 5-15 $mg \cdot L^{-1}$. In the method, the soluble copper salt comprises one or more of tetrakis(acetonitrile)copper(I) hexafluorophosphate ($C_8H_{12}CuF_6N_4P$), $CuCl_2$, $CuCl$, $CuC_2O_4$, $Cu(CH_3COO)_2$, $CuSO_4$ and $Cu(NO_3)_2$. Preferably, the reducing agent is sodium borohydride, sodium hypophosphite, borane or formaldehyde, preferably sodium borohydride, the concentration of the reducing agent may be 1-20 $g \cdot L^{-1}$, preferably 2-5 $g \cdot L^{+1}$.

In the method according to the present invention, the conductive protective layer on the surface of the copper layer in step (3) may be carbon, polyaniline, polypyrrole, polythiophene, polyacetylene or other conductive polymers. The method for coating a conductive protective layer comprises hydrothermal coating, organic coating, and CVD coating, preferably CVD coating. Preferably, the CVD coating is to coat with carbon using $C_2H_2$ gas, the conditions of coating comprises: $C_2H_2$: 1-300 sccm, preferably 50-150 sccm; temperature: 300-450° C., preferably 350-400° C.; and time: 5 min-10 h, preferably 1-4 h.

In the method according to the present invention, the heat treating in step (4) comprises: heat radiation and microwave heating, preferably microwave heating.

The present invention also provides a negative electrode, comprising a current collector and a negative electrode material, a conductive additive and a binder loaded on the current collector, wherein the negative electrode material is a negative electrode material of the present invention or a negative electrode material prepared by a method of the present invention.

The present invention also provides a lithium-ion battery, which comprises a battery shell, an electrode assembly, and an electrolyte, the electrode assembly and electrolyte being sealed in the battery shell, and the electrode assembly comprising a positive electrode, a separator, and a negative electrode, wherein the negative electrode is a negative electrode of the present invention.

The nano-tin negative electrode material and the method for preparing the same according to the present invention have the following advantages and beneficial effects.

1. The synthesis process adopted by the present invention is simple, the equipments used are conventional equipments, and the cost is low; the nano-tin-based material used can be an industrialized, low-cost tin powder, and the copper plating and carbon coating processes are simple and effective. The composite-coated nano-tin negative electrode material has excellent electrochemical performance when used as a negative electrode material for lithium-ion batteries, and has potential application prospects in portable mobile devices and electric vehicles.

2. The present invention uses the composite coating method, and the coating layers on the surface of the nano-tin consist of a copper coating layer and a conductive coating layer, wherein the copper coating layer is wrapped on the outer surface of the nano-tin, and the conductive coating layer is wrapped on the outer surface of the copper coating layer. Nano-copper has superplastic ductility and conductivity; and it has been proved that lithium ions can penetrate through the nano-copper; therefore, the copper coating layer has the following effects: (1) inhibiting the volume expansion of the nano-tin and keeping the nano-tin particles from cracking; (2) effectively avoiding direct contact between the nano-tin and the electrolyte so as to form stable SEI; and (3) increasing the conductivity of the electrode. However, nano-copper tends to be oxidized to form copper oxide and cuprous oxide and form an unfavorable SEI on the surface, which leads to a great negative effect on the electrochemical cycling performance of batteries. Therefore, the surface of the nano-copper is coated with a further conductive layer to effectively inhibit the oxidation of the nano-copper so as to improve the electrochemical performance. However, direct contact between copper and tin will form a large amount of copper-tin alloy, which is not conducive to the performance of the battery. Therefore, adding a thin carbon layer between copper and tin will further improve its electrochemical performance.

3. In the method of the present invention, the composite-coated nano-tin negative electrode material is cured by low-temperature rapid heat treating to melt the copper particles and connect them to form a copper film, thereby ensuring that the nano-tin particles are completely coated by copper.

BRIEF DESCRIPTION OF THE DRAWINGS

Hereinafter, embodiments of the present invention will be described in detail with reference to the accompanying drawings, in which.

BEST MODE FOR CARRYING OUT THE INVENTION

Figure 1:
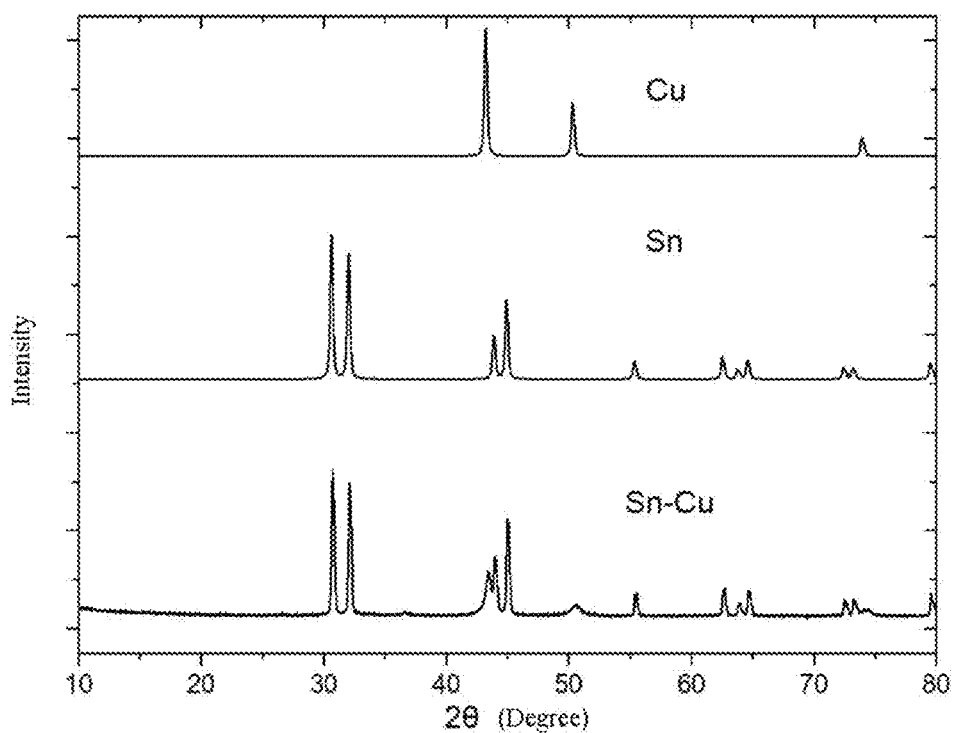
FIG. 1 is an XRD spectrum of a composite-coated nano-tin material prepared in Example 2 of the present invention.

The present invention will be described in further detail below with reference to specific embodiments. The examples given are only for the purpose of illustrating the present invention and are not intended to limit the scope of the present invention.

Example 1

(1) 2 g of tin powder with a particle size of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min, to obtain the composite-coated nano-tin negative electrode material.

Example 2

(1) 2.5 g of tin dioxide powder with a particle size of 80 nm was a weighted and placed in a tube furnace and coated with carbon by $C_2H_2$ in nitrogen, the $N_2$ flow rate was 300 sccm, the $C_2H_2$ flow rate was 50 sccm, the heating rate was 50° C./min, and the temperature was maintained at 600° C. for 30 min;

(2) The carbon-coated tin-based material is immersed into 5% hydrogen peroxide for 10 minutes, then it was filtered and oven dried, then it was placed in 1000 ml water, then 20 ml of ethanol was added to obtain a nano-tin suspension, and then the nano-tin suspension was placed in an ultrasonic machine and subjected to ultrasonic treatment for 2 h;

(3) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g of sodium borohydride was added to 200 ml water, sodium hydroxide was also added to adjust pH to 10, and then it was added dropwise into the nano-tin solution at a rate of about 30 drops/min, and finally it was filtered, washed with a copper protective agent being added, and dried in vacuum oven to obtain the nano-copper-coated nano-tin composite material; and (4) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min.

Example 3

(1) 2 g of tin powder with a particle size of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material;

(3) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min, to obtain the composite-coated nano-tin negative electrode material; and (4) The carbon-coated nano-copper-coated nano-tin composite material was placed in an ultra-high-speed microwave heating furnace protected by nitrogen and microwave-heated to 300° C., and then cooled to obtain a double layer composite-coated nano-silicon negative electrode material.

Example 4

(1) 2 g of tin powder with a particle size of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material was placed in a 200 ml reaction kettle, then 1 g toluene and 0.2 g $Ti(OBu)_4$-$AlEt_3$ catalyst were added, then the reaction kettle was filled with acetylene, and the reaction kettle was placed in a −78° C. oven to react for 10 hours. After completion of the reaction, 100 ml of 10% hydrochloric acid was added to the mixture to destroy the catalyst, and finally it was filtrated, washed, and oven dried to obtain the composite material with polyacetylene coated on the surface of the copper layer.

Example 5

(1) 2 g of tin powder with a particle size of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material and 2 ml aniline were added into 50 ml deionized water and ultrasonically mixed, then 0.5 g of ammonium persulfate was added to the mixed solution, and after reacting for 2 hours, the mixture was filtrated, washed, and oven dried to obtain a composite material with polyaniline coated on the surface of the copper layer.

Example 6

(1) 1 g of tin-carbon powder (Sn:C=1:1) with a particle size of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution; 2 g $CuSO_4$, 20 g potassium sodium tartrate, 20 g ethylenediaminetetraacetic acid, and 10 mg 2,2-bipyridine, and then sodium hydroxide was added to adjust pH to 10. Then 1 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin-carbon composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 380° C. for 90 min, to obtain the composite-coated nano-tin-carbon negative electrode material.

Example 7

(1) 1.5 g of tin-aluminum alloy (Sn:Al=95:5) with a particle size of 100 nm was weighted and added into 1000 ml water, then 10 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin-aluminum composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 380° C. for 90 min, to obtain the composite-coated nano-tin-aluminum negative electrode material.

Example 8

(1) 2 g of tin nanowires with a length of 1000 nm and a diameter of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min, to obtain the composite-coated nano-tin negative electrode material.

Example 9

(1) 2 g of tin nanowires with a length of 1000 nm and a diameter of 100 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min, to obtain the composite-coated nano-tin negative electrode material.

Example 10

(1) 2 g of tin nanosheets with a length of 200 nm, a width of 100 nm and a thickness of 20 nm was weighted and added into 1000 ml water, then 20 ml of ethanol was added to obtain a nano-tin suspension, and then the nano-tin suspension was placed in an ultrasonic machine and subjected to ultrasonic treatment for 2 h;

(2) The ultrasonic dispersed nano-tin suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, and then sodium hydroxide was added to adjust pH to 10. Then 0.6 g sodium borohydride was added into 200 ml water, sodium hydroxide was also added to adjust pH to 10, and then it was added dropwise into the nano-tin suspension at a rate of about 30 drops/min, and finally it was filtered, washed with a copper protective agent being added, and dried in vacuum oven to obtain the nano-copper-coated nano-tin composite material; and (3) The nano-copper-coated nano-tin composite material was placed in a tube furnace and coated with carbon using $C_2H_2$ in nitrogen, the $N_2$ flow rate was 300 sccm, the $C_2H_2$ flow rate was 100 sccm, the heating rate was 50° C./min, and the temperature was maintained at 300° C. for 90 min, to obtain the composite-coated nano-tin negative electrode material.

The electrical properties of the negative electrode materials prepared in Examples 1-7 were tested. The testing steps were as follows:

The prepared composite-coated nano-tin negative electrode material was uniformly mixed with super-p (conductive carbon black) and sodium alginate at a mass ratio of 6:3:1 by a mixer, then it was uniformly coated on a copper foil, placed in a vacuum drying oven, vacuum-dried at 120° C. for 12 hours, and taken out and prepared into an electrode plate.

The lithium plate was used as a counter electrode, the electrolyte was 1 mol/l $LiPF_6$ in EC+DMC (1:1 by volume), and a PP/PE/PP three-layer film was used as a separator (purchased from Celgard Corporation, USA), a CR2032 button battery was assembled in an argon-filled glove box.

The electrochemical properties test of the assembled battery was carried out using a Land tester (purchased from Wuhan LAND Electronics Co. Ltd.), with cycling for one cycle at a rate of 0.05 C and then cycling for another 49 cycles at a rate of 0.2 C, the charge-discharge cutoff voltage ranges from 0.01V to 1.0V.

Comparative Example 1

According to the above method for preparing the button battery, tin particles with a particle size of 100 nm were directly prepared into a button battery and the battery was subjected to charge-discharge cycling performance test in accordance with the electrochemical performance test conditions.

Comparative Example 2

According to the above method for preparing a button battery, the only copper-coated tin nanoparticles prepared in the step (2) of Example 1 were prepared into a button battery and the battery was subjected to charge-discharge cycling performance test in accordance with the electrochemical performance test conditions.

Comparative Example 3

According to the above method for preparing a button battery, a tin nanowire having a length of 1000 nm and a diameter of 100 nm was prepared into a button battery and the battery was subjected to charge-discharge cycling performance test in accordance with the electrochemical performance test conditions.

Comparative Example 4

According to the above method for preparing a button battery, a tin nanosheet having a length of 200 nm, a width of 100 nm and a thickness of 20 nm was prepared into a button battery and the battery was subjected to charge-discharge cycling performance test in accordance with the electrochemical performance test conditions.

Comparative Example 5

According to the above method for preparing a button battery, tin-carbon composite particles with a particle size of 100 nm were directly prepared into a button battery and the battery was subjected to charge-discharge cycling performance test in accordance with the electrochemical performance test conditions.

Comparative Example 6

According to the above method for preparing a button battery, tin-aluminum alloy with a particle size of 100 nm was prepared into a button battery and the battery was subjected to charge-discharge cycling performance test in accordance with the electrochemical performance test conditions.

Test Results and Analysis

It can be observed from the XRD spectrum of FIG. 1 that there are peaks for only the elemental tin and elemental copper in the XRD spectrum of the composite-coated nano-tin negative electrode material prepared in Example 2, and there's no peak for other element.

Figure 2:
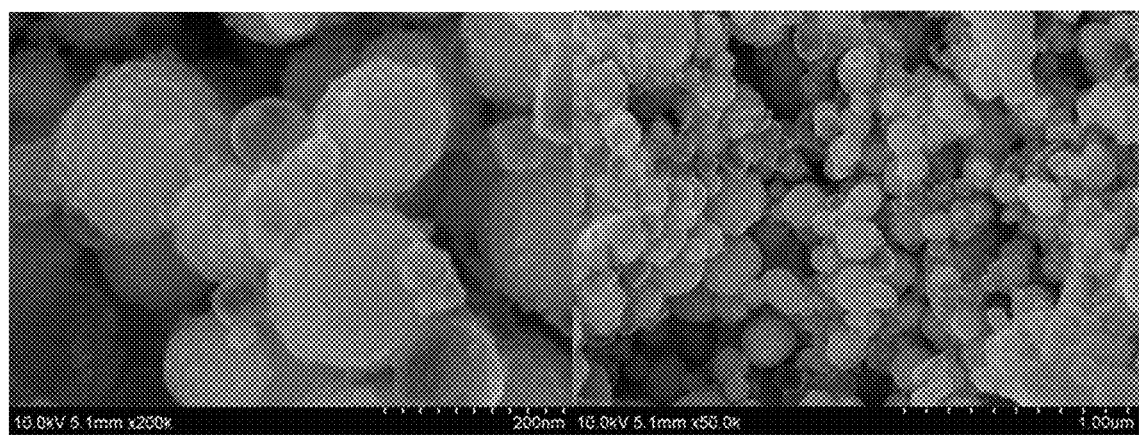
FIG. 2 is an SEM image of the composite-coated nano-tin negative electrode material prepared in Comparative Example 2.

It can be Observed from the SEM image of FIG. 2 that in the only copper-coated nano-tin negative electrode material prepared in Comparative Example 2, there is obviously a coating layer on the surface of the nano-tin particles, the coating is integrate, and tin is completely coated.

Figure 3:
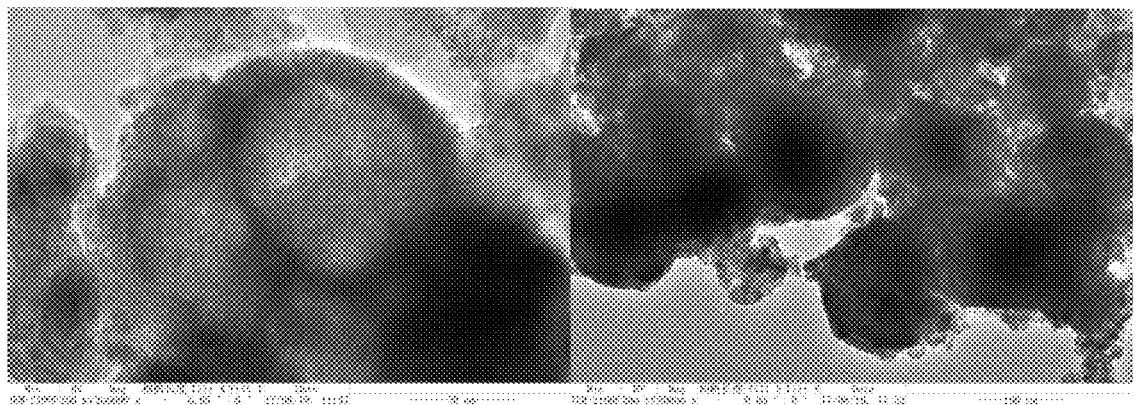
FIG. 3 is a TEM image of the composite-coated nano-tin negative electrode material prepared in Comparative Example 2.

It can be observed from the TEM image of FIG. 3 that in the only copper-coated nano-tin negative electrode material prepared in Comparative Example 2, there is obviously one coating layer on the surface of the nano-tin particles and the coating is integrate.

Figure 4:
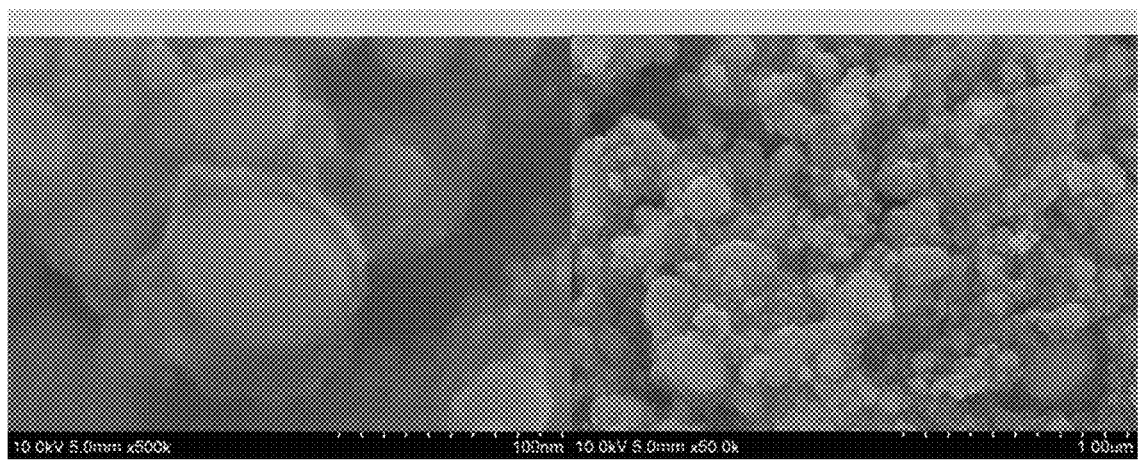
FIG. 4 is an SEM image of the composite-coated nano-tin negative electrode material prepared in Example 2 of the present invention.

It can be observed from the SEM image of FIG. 4 that in the composite-coated nano-tin material prepared in Example 2, there are some copper particles of from several nanometers to tens of nanometers on the surface of tin, and there is a carbon coating layer on the outer layer.

Figure 5:
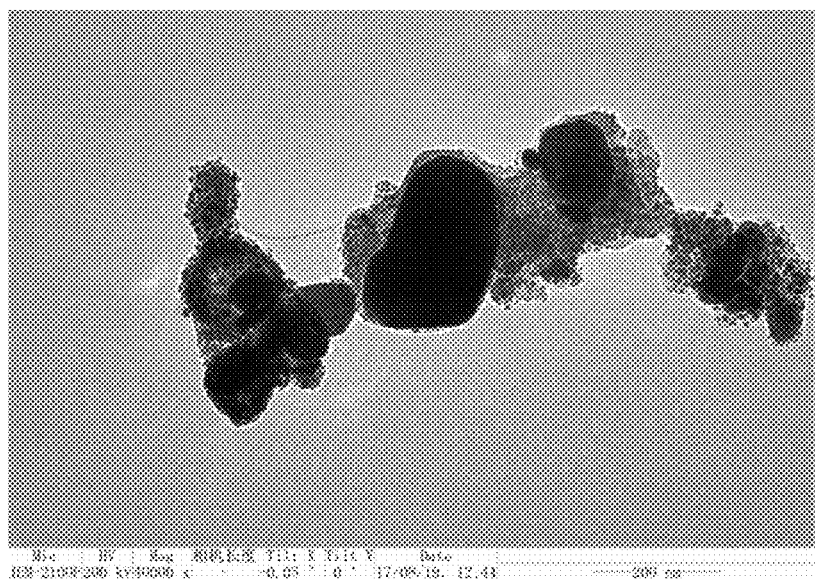
FIG. 5 is a TEM image of the composite-coated nano-tin negative electrode material prepared in Example 2 of the present invention.

It can be observed from the TEM image of FIG. 5 that in the composite-coated nano-tin material prepared in Example 2, on the surface of the nano-tin there is a copper coating layer with a nanometer thickness, and there are also some nano-copper particles on the surface, and the coating is integrate with tin being completely inside the coating layer.

Figure 6:
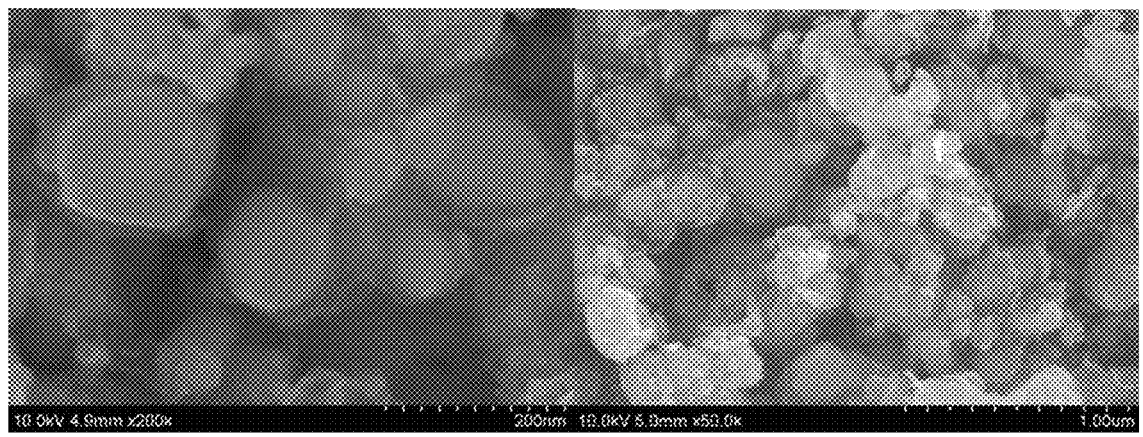
FIG. 6 is an SEM image of the only copper-coated nano-tin negative electrode material prepared in Example 3.

It can be observed from the SEM image of FIG. 6 that the composite-coated nano-tin negative electrode material prepared in Example 3 has an obvious coating layer on the surface of the tin particles.

Figure 7:
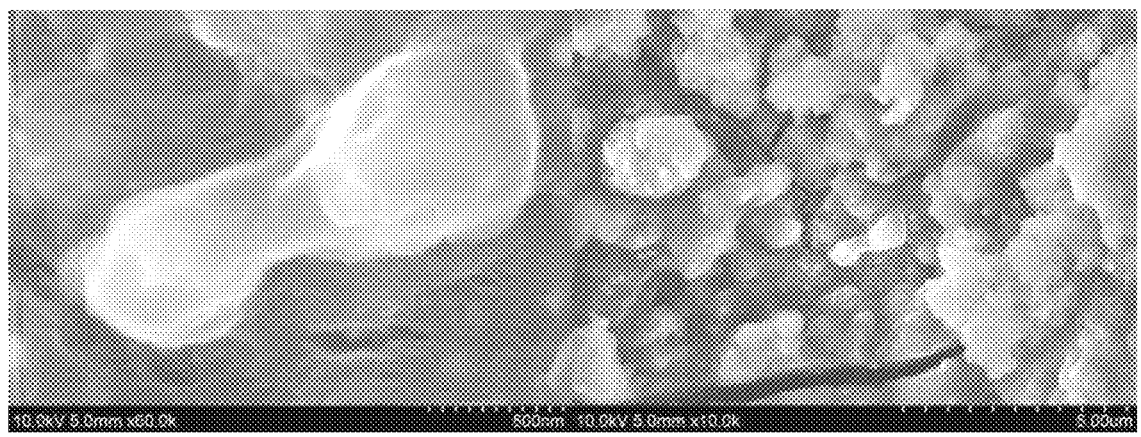
FIG. 7 is an SEM image of a lithium-ion battery comprising the composite-coated nano-tin negative electrode material prepared in Example 2 of the present invention at lithium intercalation state after 70 cycles.

It can be observed from the SEM image of FIG. 7 that the composite-coated nano-tin negative electrode material prepared in Example 2, after 70 cycles lithium intercalation, the composite-coated nano-tin material does not crack.

Figure 8:
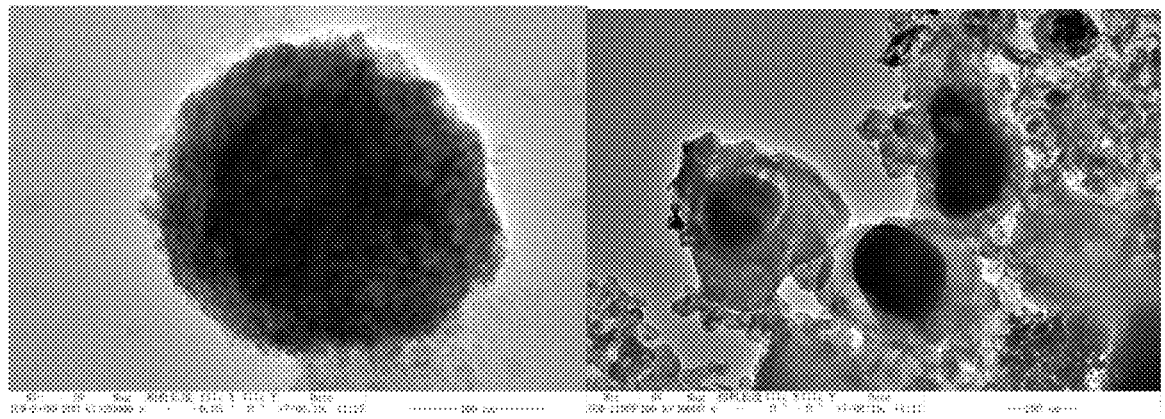
FIG. 8 is a TEM image of a lithium-ion battery comprising the composite-coated nano-tin negative electrode material prepared in Example 2 of the present invention at lithium intercalation state after 70 cycles.
Figure 9:
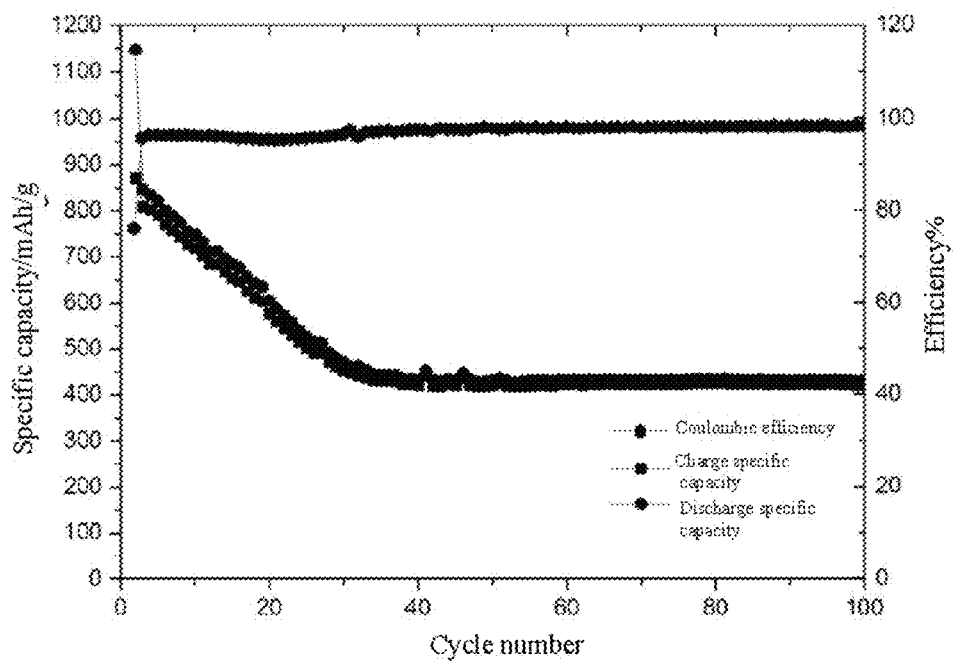
FIG. 9 is a graph showing charge-discharge cycling discharge capacity and charge-discharge efficiency of a lithium-ion battery comprising the composite-coated nano-tin negative electrode material prepared in Example 1 of the present invention.
Figure 10:
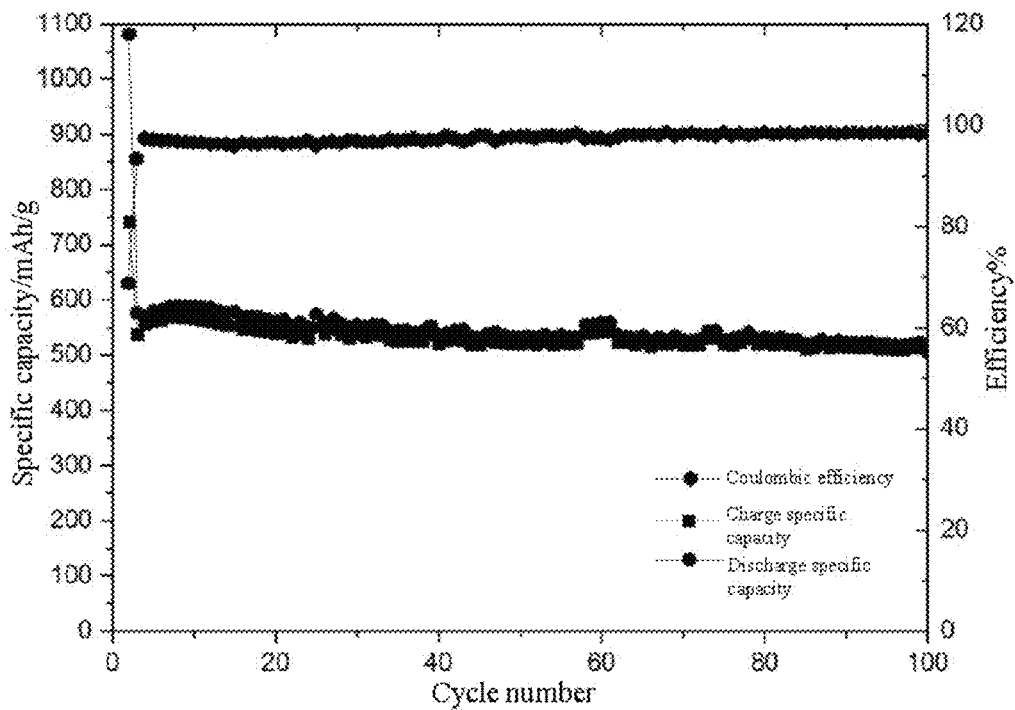
FIG. 10 is a graph showing charge-discharge cycling discharge capacity and charge-discharge efficiency of a lithium-ion battery comprising the composite-coated nano-tin negative electrode material prepared in Example 2 of the present invention.
Figure 11:
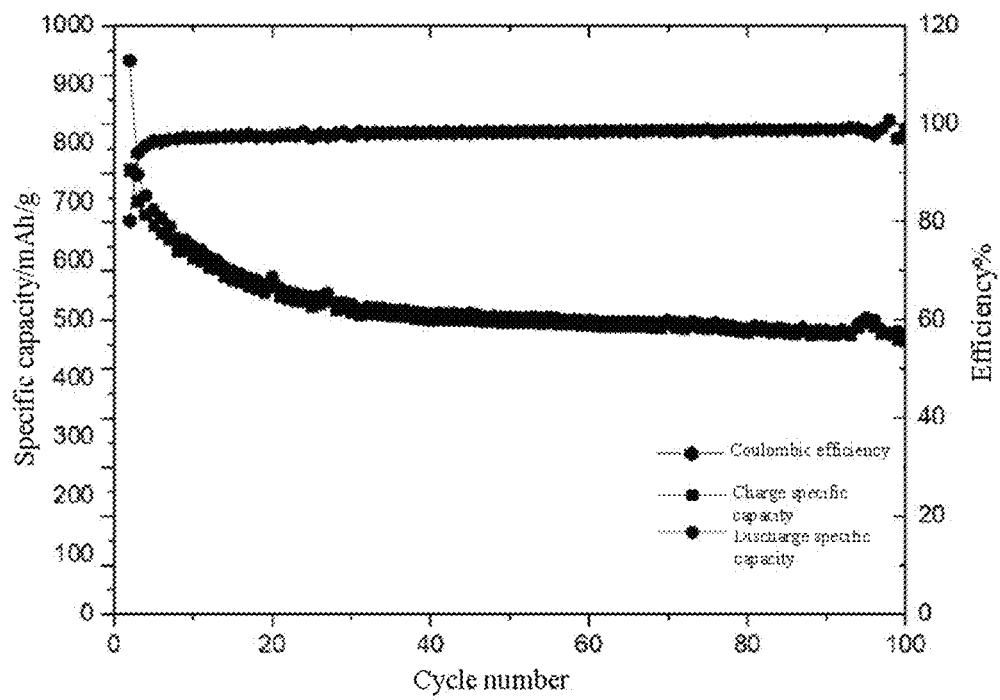
FIG. 11 is a graph showing charge-discharge cycling discharge capacity and charge-discharge efficiency of a lithium-ion battery comprising the composite-coated nano-tin negative electrode material prepared in Example 3 of the present invention.
Figure 12:
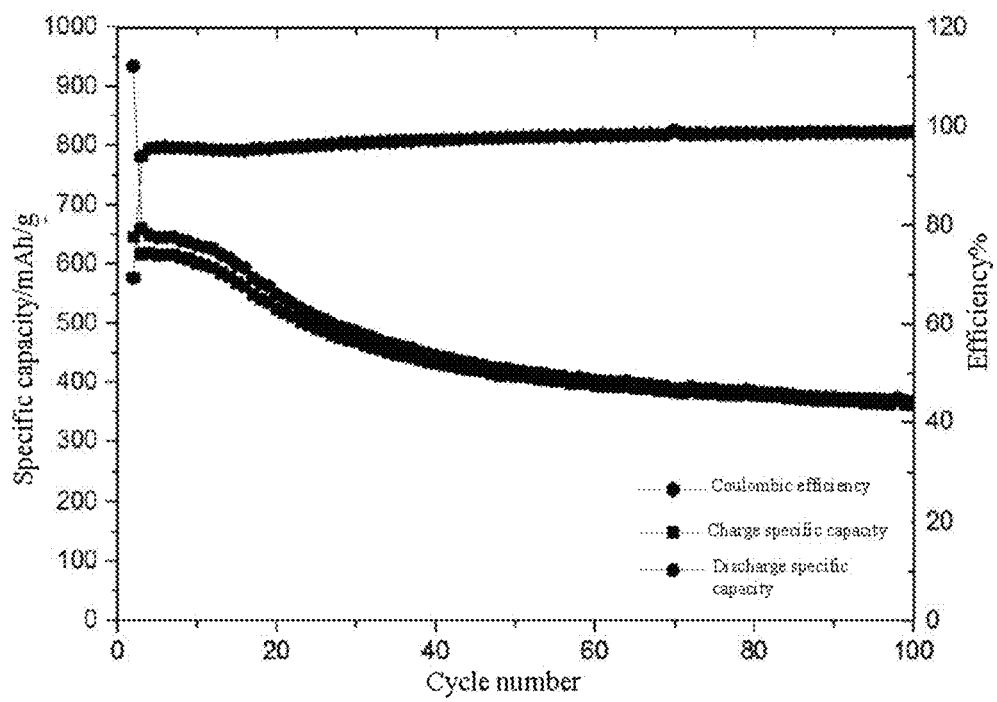
FIG. 12 is a graph showing charge-discharge cycling discharge capacity and charge-discharge efficiency of a lithium-ion battery comprising only nano-copper-coated nano-tin negative electrode material prepared in Comparative Example 2.
Figure 13:
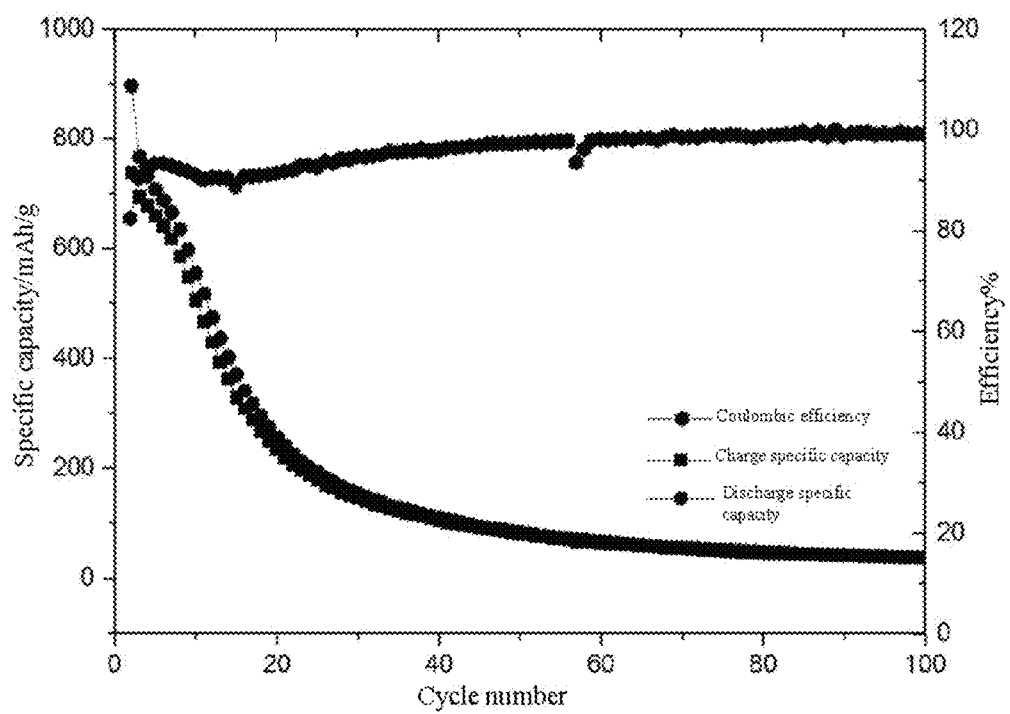
FIG. 13 is a graph showing charge-discharge cycling discharge capacity and charge-discharge efficiency of a lithium-ion battery comprising the uncoated nano-tin negative electrode material prepared in Comparative Example 1.

It can be observed from the TEM image of FIG. 8 that the composite-coated nano-tin negative electrode material prepared in Example 2, after 70 cycles lithium intercalation, the composite-coated nano-tin particles have an obvious volume expansion but still does not crack, moreover, the outer coating layer is not destroyed, and the shape of the composite-coated nano-tin particles is still maintained.

It can be observed from the charge-discharge cycle curves of the samples of Examples 1, 2, 3 and Comparative Examples 1 and 2 in FIGS. 9-13 that the electrochemical cycling performance of nano-copper-coated nano-tin negative electrode is far superior to that of uncoated nano-tin negative electrode, and the electrochemical cycling performance of the carbon-copper composite-coated nano-tin negative electrode is significantly superior to that of the only nano-copper-coated nano-tin negative electrode.

Table 1 lists the electrochemical performance comparisons of the negative electrode materials prepared in the Examples (Ex.) of the present invention and Comparative Examples (CE.). Table 2 lists the comparison of electrochemical performance of nano-tin negative electrode materials under different coating conditions.

TABLE 1

|  | Ex. 1. | Ex. 2 | Ex. 3 | Ex. 4 | Ex. 5 | Ex. 6 | CE. 1 | CE. 2 |
| --- | --- | --- | --- | --- | --- | --- | --- | --- |
| Second cycle reversible capacity (mAh/g) | 871.5 | 742.2 | 754.3 | 761.2 | 784.6 | 721.5 | 738 | 645.7 |
| Reversible capacity after 100 cycles (mAh/g) | 423.8 | 506.5 | 463.2 | 446.3 | 472.3 | 423.1 | 36.8 | 361.6 |
| Average Coulomb efficiency from the second cycle to the 100th cycle | 96.57 | 98.10 | 97.32 | 97.55 | 97.12 | 97.32 | 96.16 | 97.25 |
| Capacity retention rate after the second cycle to 100 cycles | 48.63 | 68.21 | 61.40 | 58.63 | 60.19 | 58.64 | 5.00 | 56 |

It can be observed from the data in Table 1 that the electrochemical cycling performance of nano-copper-coated nano-tin negative electrode is far superior to that of uncoated nano-tin negative electrode, and the electrochemical cycling performance of the conductive protective layer and copper composite-coated nano-tin negative electrode is significantly superior to that of the only nano-copper-coated nano-tin negative electrode.

TABLE 2

| Battery number | Tin particle size (nm) | Tin content (g/L) | CuSO$_4$ content (g/L) | C$_2$H$_2$ flow rate (sccm) | C$_2$H$_2$ introducing time (min) | Second cycle reversible capacity (mAh/g) | Reversible capacity after 100 cycles (mA/g) | Average Coulombic efficiency from the second cycle to the 100th cycle (%) | Capacity retention rate after the second cycle to 100 cycles (%) |
|---|---|---|---|---|---|---|---|---|---|
| 1 | 100 | 2 | 1 | 100 | 90 | 754.3 | 463.2 | 97.32 | 61.40 |
| 2 | 100 | 2 | 0 | 0 | 0 | 738 | 36.8 | 96.16 | 5.00 |
| 3 | 100 | 2 | 1 | 0 | 0 | 645.7 | 361.6 | 97.25 | 56 |
| 4 | 100 | 2 | 1 | 100 | 30 | 748.3 | 458.6 | 97.28 | 61.28 |
| 5 | 100 | 2 | 1 | 100 | 300 | 747.2 | 454.6 | 97.16 | 60.84 |
| 6 | 100 | 2 | 1 | 50 | 90 | 743.5 | 447.88 | 97.20 | 60.24 |
| 7 | 100 | 2 | 0.5 | 0 | 0 | 677.8 | 347. | 96.68 | 51.2 |
| 8 | 100 | 2 | 0.5 | 100 | 90 | 762.5 | 416.3 | 97.13 | 54.6 |
| 9 | 100 | 2 | 2 | 100 | 90 | 758.6 | 413.4 | 96.68 | 54.5 |
| 10 | 100 | 2 | 4 | 100 | 90 | 762.6 | 393.5 | 96.55 | 51.6 |
| 11 | 100 | 1 | 1 | 100 | 90 | 742.2 | 406.7 | 96.67 | 54.8 |
| 14 | 500 | 2 | 1 | 100 | 90 | 778.5 | 331.6 | 97.21 | 42.6 |
| 15 | 200 | 2 | 1 | 100 | 90 | 765.1 | 394.8 | 97.26 | 51.6 |
| 16 | 50 | 2 | 1 | 100 | 90 | 734.9 | 438 | 97.36 | 59.6 |
| 17 | 30 | 2 | 1 | 100 | 90 | 742.6 | 432.9 | 97.34 | 58.3 |

It can be observed from the data in Table 2 that it is most suitable that the concentration of tin is at about 2 g/L and the particle size is from 50 to 100 nm; both too little copper coating and too more copper coating have an adverse effect on battery performance; and the tin-copper mass ratio is preferably controlled at 5:1. The electrochemical performance of the battery is obviously improved after the copper layer is coated with the conductive protective layer, but the weight percentage of the conductive protective layer material is preferably controlled to be 5%-10%.

The invention claimed is:

1. A composite-coated nanosized-tin negative electrode material, comprising: a tin-based nanomaterial, a copper layer coated on the surface of the tin-based nanomaterial, and a conductive protective layer coated on the surface of the copper layer, wherein a carbon layer is further provided between the tin-based nanosized material and the copper layer, and wherein the copper layer is a layer of nanosized copper particles or a copper film having a nanometer thickness.

2. The nanosized-tin negative electrode material according to claim 1, wherein the tin-based nanosized material is one or more of tin nanosized material, tin-carbon nanosized material or tin alloy nanosized material.

3. The nanosized-tin negative electrode material according to claim 2, wherein in the tin-carbon nanosized material and the tin alloy nanosized material, the weight percentage content of tin is 2%-70%.

4. The nanosized-tin composite negative electrode material according to claim 1, wherein the particle size of the copper particles is 0.5-100 nm; and the thickness of the copper film is 0.5-100 nm.

5. The nanosized-tin composite negative electrode material according to claim 1, wherein the weight of the copper layer accounts for 2-70 wt % of the nanosized-tin-based negative electrode material; and the weight of the conductive protective layer accounts for 0.1-20 wt % of the nanosized-tin-based negative electrode material.

6. A method for preparing a nanosized-tin negative electrode material according to claim 1, comprising the steps of:
   (1) adding a tin-based nanosized material into a solvent to obtain a suspension, and then ultrasonically dispersing the suspension;
   (2) adding a copper plating agent to the ultrasonically dispersed suspension, adding a reducing agent to perform chemical copper plating, and filtrating, washing and drying the same in a vacuum oven to obtain a copper-coated tin-based nanosized composite material; and
   (3) coating a conductive protective layer on the surface of the copper-coated tin-based nanosized composite material
   wherein the method further comprises coating a carbon layer on the surface of the nanosized-tin-based material before step (1).

7. The method according to claim 6, wherein the method further comprises:
   (4) treating the composite material obtained in step (3) with heat to cure it.

8. The method according to claim 6, wherein the solvent in step (1) is one or more of water, methanol, ethanol, propanol, isopropanol, butanol, and ethylene glycol.

9. The method according to claim 6, wherein the composition of the copper plating agent in step (2) comprises one or more of tetrakis(acetonitrile)copper(I) hexafluorophosphate, CuCl$_2$, CuCl, CuC$_2$O$_4$, Cu(CH$_3$COO)$_2$, CuSO$_4$ or Cu(NO$_3$)$_2$: 1-20 g·L$^{-1}$; potassium sodium tartrate: 5-100 g·L$^{-1}$; ethylenediaminetetraacetic acid or ammonia water: 5-100 g·L$^{-1}$; 2,2-bipyridine: 1-50 mg·L$^{-1}$; and the reducing agent is sodium borohydride, sodium hypophosphite, borane or formaldehyde, and the concentration of the reducing agent is 1-20 g·L$^{-1}$.

10. The method according to claim 6, wherein the conductive protective layer in step (3) is one or more of carbon, polyaniline, polypyrrole, polythiophene, and polyacetylene.

11. A negative electrode which comprises a current collector and a negative electrode material, a conductive additive and a binder loaded on the current collector, wherein the negative electrode material is a negative electrode material of claim 1 or a negative electrode material prepared by a method according to claim 6.

12. A lithium-ion battery which comprises a battery shell, an electrode assembly, and an electrolyte, the electrode assembly and electrolyte being sealed in the battery shell, and the electrode assembly comprising a positive electrode, a separator, and a negative electrode, wherein the negative electrode is a negative electrode of claim 11.

13. The nanosized-tin negative electrode material according to claim 2, wherein the tin nanosized-material, the tin-carbon nanosized-material or the tin alloy nanosized-material comprise nanoparticles, nanowires, or nanosheets.

14. The nanosized-tin negative electrode material according to claim 13, wherein the nanoparticles have a particle size of 5-1000 nm; the nanowire has a length of 10-5000 nm, and a diameter of 5-1000 nm; and the nanosheet has a length and a width of 10-5000 nm and a thickness of 1-500 nm.

15. The nanosized-tin negative electrode material according to claim 2, wherein the thickness of the copper layer is 0.5-100 nm, and the thickness of the conductive layer is 1-100 nm.

16. The nanosized-tin negative electrode material according to claim 3, wherein the tin alloy is selected from one or more of tin-aluminum alloy, tin-tin alloy, tin-silver alloy, and tin-magnesium alloy.

17. The nanosized-tin negative electrode material according to claim 4, wherein the particle size of the copper particles is 1-50 nm; and the thickness of the copper coating layer is 1-50 nm.

18. The nanosized-tin negative electrode material according to claim 5, wherein the weight of the copper layer accounts for 10-30 wt % of the nanosized-tin-based negative electrode material; and the weight of the conductive protective layer accounts for 1-10 wt % of the nanosized-tin-based negative electrode material.

* * * * *